Sept. 5, 1961        R. T. GLASS        2,998,784
STICKHOLDER FOR CONVEYOR-TYPE FROZEN-CONFECTION-PRODUCING MACHINE
Filed May 29, 1959        3 Sheets-Sheet 1
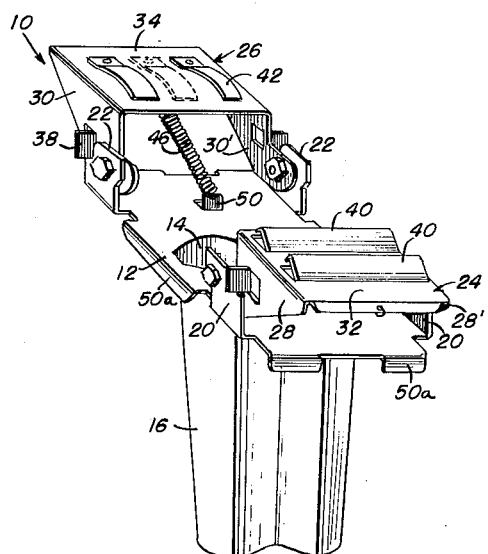
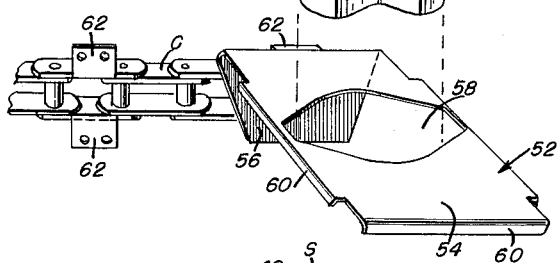
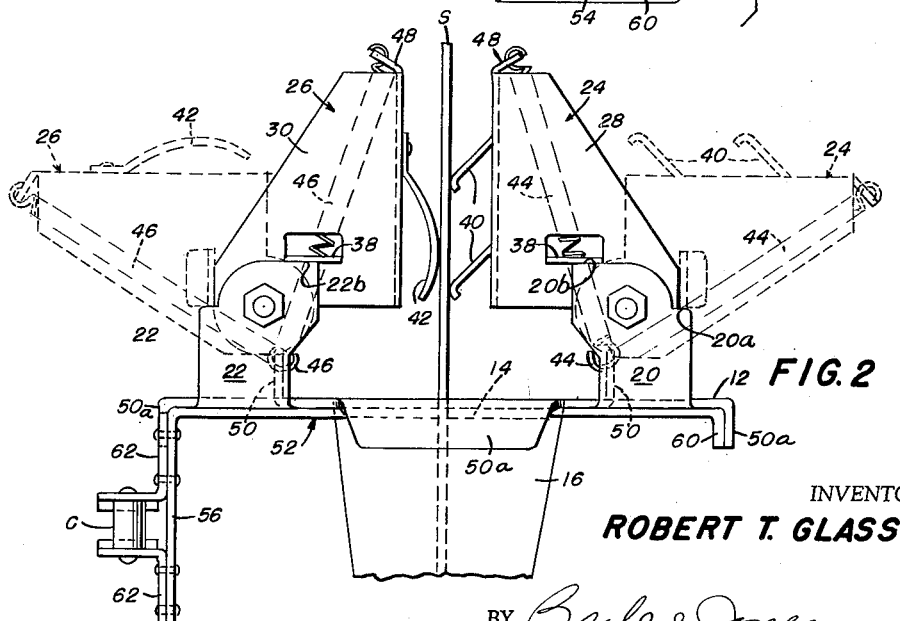
INVENTOR
ROBERT T. GLASS
BY *Beale & Jones*
ATTORNEYS

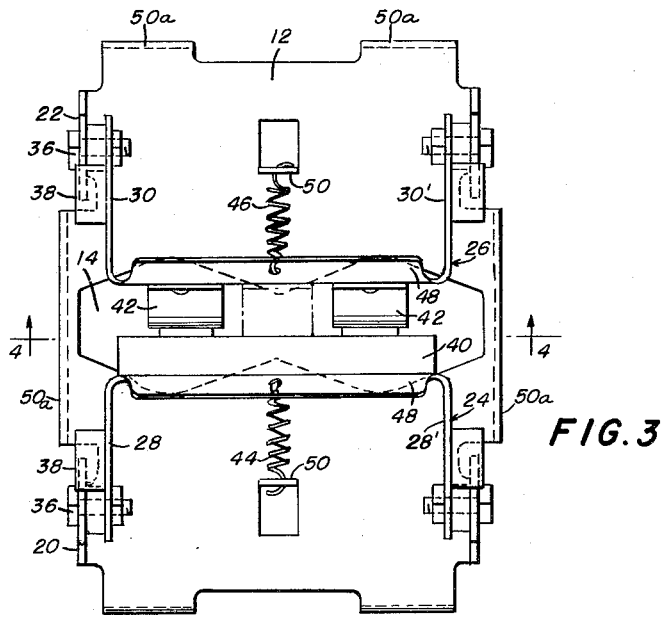
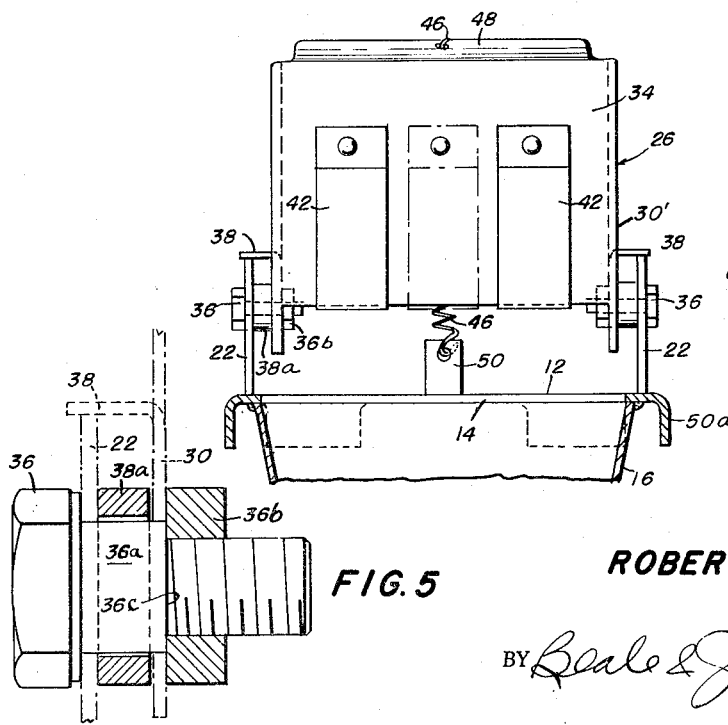

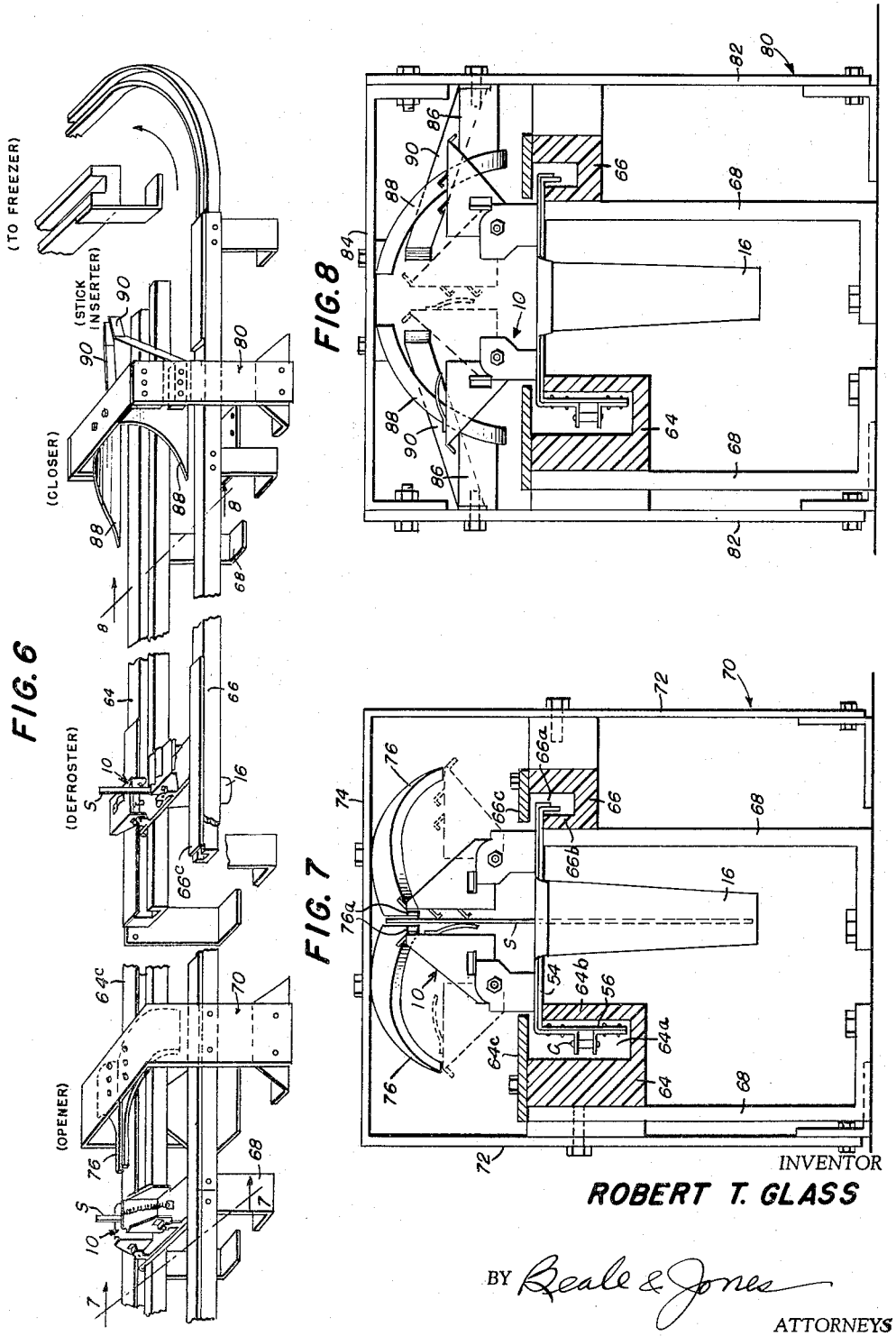

United States Patent Office 2,998,784
Patented Sept. 5, 1961

2,998,784
STICKHOLDER FOR CONVEYOR-TYPE FROZEN-CONFECTION-PRODUCING MACHINE
Robert T. Glass, 409 W. 6th St., Austin, Tex.
Filed May 29, 1959, Ser. No. 816,843
10 Claims. (Cl. 107—8)

This invention relates to a stickholder for a conveyor type frozen confection machine. More specifically, this invention relates to a stickholder adapted to work on and be associated with an individual mold comprising one of a plurality of molds of a frozen confection machine of the conveyor type. The stickholder of this invention is adapted to be closed by cam means over its associated mold and to receive, in said closed disposition, and hold a frozen confection stick in proper position during the freezing of the confection. Subsequently, said stickholder is adapted to be opened by cam means to allow removal of the frozen confection from said mold.

This application relates to the subject matter of my co-pending application Serial Number 572,084, filed March 16, 1956, entitled, "Confection Machines," now U.S. Patent No. 2,953,997 issued September 27, 1960.

The present application is a continuation-in-part of my earlier application now Patent 2,892,423, issued June 30, 1959.

The increased popularity of stick-type frozen confections has created a tremendous demand which has necessitated the development of high-speed equipment by which they may be produced. The most desirable of such apparatuses are the conveyor-type frozen-confection producing machines which comprise a plurality of molds drawn along by a continuously moving chain conveyor. The development of such apparatuses has made obsolete the old-fashioned clip type stickholders which required manual insertion of the stick and locking of the holder about the stick.

As a contrast, under the invention of this application, my stickholder is adapted to be opened or closed automatically by stationary cam means positioned in the path of the continuously moving conveyor. The stickholder of my invention is adapted to open or close quickly and not to interfere with the operation of the various components of the machine.

Accordingly, it is an object of my invention to provide a stickholder adapted to be automatically opened or closed as the conveyor type confection machine moves in normal course.

It is a further object of this invention to provide a stickholder for a conveyor-type frozen-confection machine which is adapted to be used with molds of various shapes and sizes.

It is a further object of this invention to provide a stickholder for frozen confection machines which, when closed, is adapted to receive a resilient compressing engagement the confection stick and to hold the same during the freezing process.

It is a further object of this invention to provide a stickholder adapted to operate quickly to meet the demands of modern high-speed confection-producing machines.

It is a further object of this invention to provide a stickholder of durable and foolproof construction which may be inexpensively produced.

This invention embodies other novel features, details of construction and arrangement of parts which are hereinafter set forth in the specification and claims, and illustrated in the accompanying drawings, wherein:

FIG. 1 is an exploded perspective view of the invention;
FIG. 2 is a fragmentary enlarged and elevation view showing in phantom the stickholder in the open position;
FIG. 3 is an enlarged top plan view;
FIG. 4 is a fragmentary sectional view taken on the line 4—4 of FIG. 3;
FIG. 5 is a greatly enlarged fragmentary view showing part of the pivot means of the stickholder;
FIG. 6 is a reduced perspective view, partly schematic, showing a conveyor system including the stickholders of the invention;
FIG. 7 is an enlarged sectional view taken on the line 7—7 of FIG. 6; and
FIG. 8 is an enlarged sectional view taken on the line 8—8 of FIG. 6;

Briefly, the invention is a stickholder for a mold in a frozen-confection-producing machine comprising a base plate having a central cutout about the underside of the edges of which are secured the lips of such mold, the plate having on each side of said cutout pivot means, a stick-supporting member pivoted to each pivot means, each of said members having a face, said members adapted to pivot to a closed position wherein said faces are adjacent and oppose each other over said cutout and are adapted to hold in resilient compressive engagement a stick extending upwardly from a frozen confection in such mold.

Referring more specifically to the drawings, FIG. 1 shows an embodiment of the invention in which the mold unit including the stickholder is generally designated 10. It comprises a horizontally disposed plate 12 which is formed with a central cutout or aperture 14 about the underside of the edges of which are soldered the lips of a mold 16. Adjacent each lengthwise end of the plate 12 a pair of ears 20—22 are struck upwardly. Near the upper ends each of the ears is apertured in alignment with the aperture in the ear opposite. Pivoted to the ears are the stick-supporting members 24 and 26 each comprising a pair of arms 28, 28', 30 and 30' extending perpendicular to the side edges of a flat face 32 and 34.

FIG. 2 is an enlarged view showing how the stick-supporting members 24 and 26 are pivoted to plate 12. As shown, each of the four arms 28, 28', 30 and 30' is formed with an aperture adjacent its lower end. Through each of these apertures and also through the aperture in the adjacent ears extends a bolt 36 (detailed in FIG. 5). Each of the bolts carries an enlarged neck 36a adjacent its head. It is this enlarged neck which forms a spindle or axis for the pivoting of the respective arms. After extending first through the aperture in the ear 22 (FIG. 5) and then through the aperture in the respective arm member 30, each bolt 36 receives in threaded engagement a nut 36b which is tightened down to the shoulder 36c on the bolt formed at the end of the enlarged neck. In order to prevent free play between the ear and the arm, each pivot bolt is provided with a spacing washer 38a. The spacing washer obviously precludes the freezing together of an ear and arm to which it is pivoted.

As shown in FIG. 2, each of the four arms 28, 28', 30 and 30' is formed with a stop member 38 struck up therefrom and extending outward perpendicular to the surface of the arm. Each stop is adjacent the pivot aperture in the respective arm. The purpose of the stop members 38, of course, is to limit the travel of the stick-supporting or holding members 24 and 26 in the open or closed direction. Cooperating with each stop member 38 to achieve this result as far as open or outward travel of the support member is concerned is a shoulder 20a or 22a formed on the outside of each ear. As shown, this shoulder is formed in the outside of the ear at about the level of the pivot aperture. Thus as the stick-supporting or holder member 24 or 26 pivots outward, its movement will stop as the stop member 38 abuts the shoulder 20a or 22a. Cooperating with the stop member to limit the pivot of the stick-supporting members in the closed direction is a horizontal upper edge 20b or 22b of the ear. The stop member 38 is spaced on the arm so that when it hits the upper edge 20b or 22b, the face 32 or 34 of the stick support member is substantially vertical.

To effect a clamping action when the stickholding members are in the closed position, the face of each stickholding member has inwardly extending projections. The face 32 of the member 24 is formed with upstruck louver-like projections 40 extending horizontally there-across. The louvers 40 are spaced and each comprises a downwardly extending surface rounded inwardly at the bottom edge. The louvers are fixed and non-resilient. The face 34 of the member 26 is flat but has riveted or welded thereto at least one resilient strip 42. The strip or strips extend downwardly away from the face and thence back inwardly. When the stick-supporting members 24 and 26 are in the closed position, the louver members 40 are contacted by, or at least in close proximity to the resilient strip. Hence when a confection stick is inserted from above down into the mold 16, its upper end is compressively held between the projections of the two members 24 and 26 as shown in FIG. 2.

Whether the stickholding member 26 is provided with one, two, or three resilient strips 42 depends on the number of sticks with which the confection is provided. An ice confection for which mold 16 with its two lobes was designed, requires two sticks. Hence two resilient strips 42 are disposed in spaced relation in face 34. For the conventional frozen confection of the candy-coated ice cream type only one stick 42 is required. This could be held by a single strip positioned at the center of face 34 as shown in phantom in FIG. 1.

Means for holding the stickholding members firmly in the closed position comprise a pair of special springs 44 and 46. The springs are arranged as shown in FIG. 2. They are fastened at one end to the stick-supporting members through an aperture in a rearwardly struck lug 48 on the top of each face. The opposite end of each spiral spring is attached to a similar lug 50 struck up in the plate and positioned between the axis of the stick-supporting member and the aperture 14 as shown. Thus the spiral springs are anchored to the plate 12 and there is established an over-center relation with the result that the spring 44 or 46 serves to bias the stickholder in either the closed or the open position depending on which side of the pivot axis the spring lies.

The spiral springs 44 and 46 are sufficiently strong to hold the associated stickholder member firmly in the closed position. They are consequently strong enough to quickly snap the members 24 and 26 into the open or closed disposition when the members are moved so that the springs pass the over-center position.

Means for supporting the plate 12 and for conveying it along are shown in FIG. 1. As shown, the end edges as well as the side edges of the plate 12 have down-turned flanges 50a. These flanges extend only partly along each edge. The flanges serve to hold the stickholder in position on a carrier bracket 52. The carrier bracket 52 is an L-shaped device having an elongated flat horizontally disposed carrier plate 54 at one end of which is a downturned arm 56 having inwardly and downwardly tapered side edges. The flat plate 54 of the bracket has a large opening 58 near its center. At the side and end edges of the flat surface 54 of the bracket are downturned flanges 60. Thus when the stickholder is in operative position, the mold 16 extends down through the opening 58 and the mold plate 12 nests over the flat carrier plate 54 of the bracket, the flanges 50a fitting over the flanges 60. The opening 58 is sufficiently large to accommodate any appropriate mold 16.

To provide for movement of each mold unit, the downturned arm 56 of each bracket is connected to the conveyor chain C of the frozen confection machine. This may be accomplished by securing a pair of oppositely directed clips 62 to the links at a point in the chain. The distal legs of the clips may then be riveted to the downturned arm 56 of the L-shaped bracket. In order that there be no interference between the uppermost clip 62 and the downturned flange 50a at the end of the plate 12, the downturned flange is omitted in the central area of the edge on that end of the plate 12.

The integration of a group of mold units with stickholders into the frozen confection machine is shown in FIGS. 6–8. The frozen confection machine shown is similar to that described in my co-pending application, Serial No. 398,100, filed December 14, 1953, now U.S. Patent No. 2,925,052 issued February 16, 1960, and indicated related patents. The conveyor associated with the machine comprises a pair of parallel horizontally disposed rail units 64 and 66. These rail units are supported by a plurality of upstanding brackets 68 secured to the support table T of the machine. As shown in cross section in FIGS. 7 and 8, the rail unit which may be a rigid material each have a central recess 64a and 66a running the length thereof and in cross section have substantially a U-shape. The inner walls 64b and 66b of the U-shaped structure—the walls closest the mold—are not so high as the outer walls. The upper surfaces of each inner wall are flat and on them ride the underside of the flat conveyor plate 54 of the L-shaped bracket. As shown, the conveyor chain C of the confection machine extends along the recess 64a of the rail unit 64. The downturned arm 56 of the L-shaped brackets also ride in this recess. Into the recess 66a of the opposite rail unit extend the downturned flanges 50a—60 on the end of the flat conveyor plate and the end of the plate 12 respectively. These extensions down in the recesses of the two rail units serve to steady the mold units from lateral slipping as their movements progress. Cover plates 64c and 66c extend over each recess to preclude the possibility of dirt falling thereinto. Plates 64c and 66c also serve to hold down the mold and stickholder assembly in the defroster area where the confection is pulled upwardly and withdrawn. There are no cover plates 64c and 66c in the run between the defroster and the closer 80 in order to permit removal of the mold and stickholder assemblies from the conveyor plate in this area.

Shown at the right-hand portion of FIG. 6 of the drawings is an interruption in the conveyor rail 64. Here is normally positioned a sprocket wheel associated with the frozen confection stick inserter which is the subject of my co-pending application, now Patent 2,892,423, issued June 30, 1959.

It should be understood that the mold units 10 are spaced along the conveyor chain C at regular intervals. Some units have been omitted from FIG. 6 to avoid overcomplication of the drawings.

It can be seen that by virtue of the structure of the stickholders as disclosed herein it is a simple matter to open and close the members 24 and 26 by stationary cam means positioned in the path of the mold units and designed to separate the faces of the stickholding members or to urge them together. The separating or urging together need not completely open or close the holders—it being merely necessary to move the stickholding members past their overcenter position.

Cam means for opening the stickholding members to allow removal of the confection from its mold is shown in detail in FIG. 7 and is generally designated 70. This means comprises side standards 72 which are secured at their lower ends to the table T at either side of the mold path. The side standards are additionally steadied by securement to the rail units 64 and 66 as shown. Bridging the upper ends of the side standards is the horizontal upper support member 74 to the underside of which are bolted the opening cam plate proper 76. The plates are slightly spaced to allow passage of a stick S and are complementary. They each carry a narrow forward extension 76a against the outside of which the upper portion of face 32 or 34 of one of the stickholders rides at the beginning of the opening process. From this extension the plates 76 widen and curve downwardly to wedge the stickholder member 24 or 26 effectively to the over-center position. The cam edges of the plates 76, however, extend beyond the overcenter position of the faces 32 and 34 to force the faces to the completely open position (see FIG. 7). Thus the plates 76 assure the opening of the members 24 and 26 even at the occurrence of a frozen pivot which might hamper the action of the overcenter spring 44 or 46.

The cam means for closing the stickholders is well shown in FIG. 8 and is generally designated 80. This means comprises the side standards 82 and the horizontal upper support member 84 similar to those of the opening cam means 70. Secured to the inner surface of each of the side standards above each rail unit is an inwardly extending support block 86. The inner end of each support block 86 is fixed to one of the closing cam plates 88. These plates each curve up inwardly and are secured at their upper inner ends to the underside of the horizontal upper support member 84. To close the stickholding members 24 and 26 effectively, the plates 88 each carry outer forward extensions which curve first gradually then more abruptly inward. Also secured to the side standards 82 are rearwardly and inwardly extending spring fingers 90. These further insure closing of the stickholders.

FIG. 6 demonstrates that as the mold-stickholder units progress they first encounter opening cam 70. Thereafter the molds may be defrosted and the confection removed. After this, the molds may be filled with unfrozen confection. Next the units encounter the closing cam means 80 and sticks are inserted into the confection prior to freezing.

By simple fixed cam structures the stickholders of my invention are easily and automatically operated. It will be noted by those familiar with this art that my invention constitutes a long-needed advance.

While this invention has been shown in but one form, it is obvious to those skilled in the art that it is not so limited but is susceptible of various changes and modifications without departing from the spirit and scope of the claimed invention.

I claim:

1. A stickholder for a mold in a frozen-confection-producing machine comprising a base plate having a central aperture adapted to fit about the mouth of such a mold, said plate having attached thereto a pair of pivot means disposed on opposite sides of said aperture respectively, a stick-supporting member pivoted to each pivot means, each of said members having stick-engaging means said members adapted to pivot to a closed position wherein said stick-engaging means are adjacent and oppose each other over said aperture releasable means to hold the stick-supporting members in the closed position, said stick-engaging means being adapted to hold an upwardly extending frozen confection stick therebetween while said stick-supporting members are in such closed position, and said stick-supporting members are also adapted to pivot outwardly to an open position wherein said stick-engaging means are remote from each other.

2. A stickholder for a mold in a frozen-confection-producing machine as described in claim 1 wherein said releasable means comprise over-center biasing means attached to each of said stick-supporting members biasing the stick-supporting members in either the open or closed position depending on the relative position of the stick-supporting members and the base plate.

3. A stickholder for a mold in a frozen-confection-producing machine as described in claim 1 wherein one of said stick-engaging means comprises a spring strip secured to one of said stick-supporting members and is directed generally toward the other stick-supporting member and is adapted to engage resiliently such stick.

4. A frozen-confection-producing machine comprising an endless conveyor, said conveyor having attached thereto at regular intervals respectively a plurality of horizontally disposed conveyor plates, means for supporting said horizontally disposed plates in a horizontal disposition, a plurality of generally cup-shaped frozen confection molds each having a base plate extending out from the mouth thereof, each of said conveyor plates having a cut out therein and one of said molds received by the cut out in each of said conveyor plates with the base plate of said mold resting on the associated conveyor plate, each of said base plates having a pair of pivot means disposed on opposite sides of the axis of said mold respectively, a pair of stick-supporting members pivoted to each pair of pivot means respectively, each of said stick-supporting members having stick-engaging means, each pair of stick-supporting members being adapted to pivot to a closed position wherein said stick-engaging means are adjacent and oppose each other over each mold, releasable means to hold the stick-supporting members in such closed position, said stick-engaging means being adapted to hold an upwardly extending frozen confection stick therebetween while said stick-supporting members are in such closed position, and said pairs of stick-supporting members being also adapted to pivot outwardly to an open position.

5. A frozen-confection-producing machine as described in claim 4 wherein said releasable means comprise over-center biasing means attached to each of said stick-supporting members, said over-center biasing means biasing the stick-supporting members in either the open or closed position depending on the relative position of the stick-supporting members and the base plate.

6. A frozen-confection-producing machine as described in claim 4 wherein cam means are stationed at fixed positions along the conveyor and each of said stick-supporting members has cam-coacting means thereon whereby as the molds successively move past the cam means, the cam-coacting means associated with said molds respectively engage said cam means and said stick-supporting members are opened and closed by said cam means.

7. In a machine for producing frozen confections comprising an endless conveyor carrying in single file a plurality of molds, a stickholding system in which each of said molds has secured thereto a stickholder comprising a base plate having attached thereto a pair of opposed pivoting stick-supporting members, said stick-supporting members being pivotable from an open position to a closed position, an overcenter biasing means for each stick-supporting member biasing said stick-supporting member toward the open or closed position depending on the relative position of the stick-supporting member and said base plate, said stick-supporting members adapted to support an object therebetween when said stick-supporting members are in the closed position, cam-coacting means on each of said stick-supporting members, and cam means stationed at points along said conveyor to engage the cam-coacting means on said stick-supporting members to open and close said stickholders respectively successively as they pass by said points.

8. A structure as described in claim 7 wherein each of said cam means comprises an inverted U-shaped standard straddling said conveyor and a pair of cam plates secured under the bight of said U-shaped standard, said plates for each standard being the opposite of each other and having curving cam surfaces adapted to engage the outer ends of said pivoted stick-supporting members to respectively open and close said stickholders.

9. For a frozen-confection-producing machine a mold assembly comprising a substantially cup-shaped mold having secured about the mouth thereof a substantially rectangular base plate, said base plate having on opposite sides of the mouth of said mold respectively two pairs of respectively aligned up-struck ears, said ears having respectively aligned apertures formed therein, pins disposed respectively in the aperture of each ear, a pair of substantially U-shaped stick-holding members, the distal end of each of the legs of the U-shaped members being apertured to receive respectively one of said pins, whereby said U-shaped members are pivotally related to said base plate and may be pivoted from an open position to a closed position wherein the bights of said U-shaped members confront each other over the mold, said base plate having a pair of upstanding lugs disposed respectively substantially under the axes of pivot of the stick-holding members, a pair of coil springs connected respectively between the lugs and a remote portion of the adjacent stick-holding members to comprise over-center bias means for each of said stick-holding members, stick-engaging means carried by the surface of the bight of each U-shaped member which is most remote from the pivot of the said U-shaped member, whereby when the U-shaped members are in the closed position, the stick-engaging means are adapted to engage and support a frozen-confection stick extending upwardly from the mold.

10. A mold assembly as described in claim 9 wherein said stick-engaging means on one of said U-shaped members comprise a pair of spaced rigid louver members and on the other of said U-shaped members comprise a spring strip convex toward the opposite stick-holding member.

References Cited in the file of this patent

UNITED STATES PATENTS

| | | |
|---|---|---|
| 740,346 | Williams | Sept. 29, 1903 |
| 1,575,214 | Kohler | Mar. 2, 1926 |
| 2,559,463 | Rasmusson | July 3, 1951 |
| 2,614,510 | Heise | Oct. 21, 1952 |
| 2,625,120 | Eddy | Jan. 13, 1953 |